Patented Nov. 23, 1943

2,335,045

UNITED STATES PATENT OFFICE 2,335,045

TRIAZINE DERIVATIVES

Gaetano F. D'Alelio and James W. Underwood, Pittsfield, Mass., assignors to General Electric Company, a corporation of New York No Drawing. Application May 23, 1942, Serial No. 444,264

20 Claims. (Cl. 260—248)

This invention relates to new chemical compounds and more particularly to triazine derivatives. The invention especially is concerned with the production of new and useful diamino triazinyl halogeno carboxy-, carboaliphaticoxy- and carboaromaticoxy-alkyl sulfides.

The chemical compounds of this invention may be represented by the following general formula:

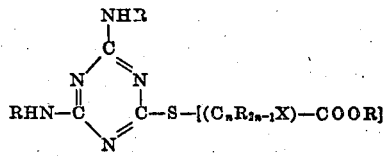

In the above formula $n$ represents an integer and is at least 1 and not more than 2, X represents a halogen atom, more particularly a chlorine, bromine, fluorine or iodine atom, and R represents a member of the class consisting of hydrogen and monovalent hydrocarbon and substituted hydrocarbon radicals, more particularly halo-hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in the —NHR groupings of Formula I is hydrogen and the R in the —COOR grouping is either hydrogen or an unsubstituted monovalent hydrocarbon radical, e. g., an aliphatic radical such as methyl, ethyl, propyl, butyl, pentyl, hexyl, allyl, methallyl, crotyl, etc. However, there also may be produced in accordance with the present invention compounds such, for instance, as those represented by the general formulas:

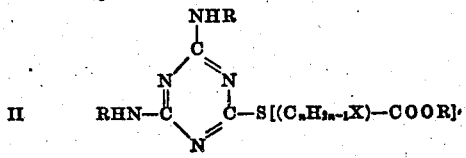

and, more particularly,

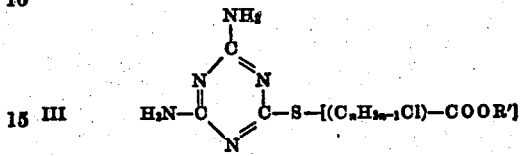

and

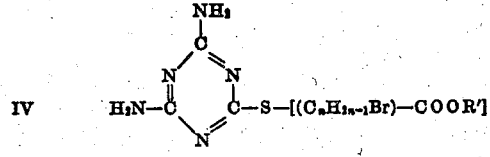

where $n$, X and R have the same meanings as given above with respect to Formula I and R' (Formulas III and IV) represents hydrogen or an unsubstituted hydrocarbon radical, numerous examples of which have been given above.

The new compounds of this invention may be used, for example, as pharmaceuticals, plasticizers and as intermediates in the preparation of derivatives thereof such as hydrazo, hydrazino, carbazido, semicarbazido, ureido, amidine, methylol, etc., derivatives of the individual compound embraced by Formula I. Compounds containing a —COOH grouping may be amidated; or the hydrogen of the carboxy grouping may be replaced by a substituent such, for instance, as an ammonium radical or a monovalent metal, e. g., an alkali metal such as sodium, potassium, lithium, etc. Our new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. They are particularly useful as such or in the form of their soluble, fusible aldehyde-reaction products as agents for accelerating the conversion of acid-curing thermosetting resins, e. g., acid-curing thermosetting aminoplasts and phenoplasts, to an insoluble, infusible state. (In our copending application Serial No. 444,263, filed May 23, 1942, and assigned to the same assignee as the present invention, we have more fully described and specifically claimed compositions comprising the product of reaction of ingredients comprising an aldehyde and a compound of the kind represented by Formula I; and compositions comprising an acid-curing, thermosetting resin carrying a curing agent therefor comprising a compound of the kind represented by Formula I or a soluble, fusible aldehyde-reaction product of such a compound.) These new compounds also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between equimolecular proportions of a mercapto (monomercapto) diamino s-triazine (symmetrical triazine) and a corboxy-, carboaliphaticoxy- or carboaromaticoxy-alkyl dihalide. When a carboxy (—COOH) alkyl dihalide is used as a starting reactant and the proportions of reactants and reaction conditions are such that the hydrogen atom of the —COOH grouping is replaced by the residue of the hydrohalide acceptor, e. g., by an alkali metal, the carboxy compound desired as a final product is obtained by treating this intermediate product with hydrochloric, hydrobromic, sulfuric or other suitable inorganic or organic acid in an amount just sufficient to form the desired carboxy derivative.

Illustrative examples of diamino mercapto s-triazines that may be employed, depending upon the particular end-product sought, are:

2-mercapto 4,6-diamino s-triazine (4-mercapto 2,6-diamino s-triazine; 6-mercapto, 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-hexylamino 6-xenylamino s-triazine
2-mercapto 4-cyclohexenylamino 6-naphthylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-propylanilino 6-phenylpropylamino s-triazine
2-mercapto 4-dichloroanilino 6-chloroethylamino s-triazine
2-mercapto 4,6-di-(fluoroanilino) s-triazine
2-mercapto 4,6-di-(bromotoluido) s-triazine
2-mercapto 4,6-di-(iodoanilino) s-triazine
2-mercapto 4-amino 6-bromoethylamino s-triazine
2-mercapto 4-amino 6-methylamino s-triazine
2-mercapto 4-amino 6-ethylamino s-triazine
2-mercapto 4-amino 6-benzylamino s-triazine
2-mercapto 4-amino 6-xenylamino s-triazine
2-mercapto 4-amino 6-propylamino s-triazine
2-mercapto 4-amino 6-chloroethylamino s-triazine
2-mercapto 4-amino 6-naphthylamino s-triazine
2-mercapto 4,6-di-(cyclopentylamino) s-triazine
2-mercapto 4-isobutylamino 6-neopentylamino s-triazine
2-mercapto 4-benzylamino 6-toluido s-triazine
2-mercapto 4-cyclohexylamino 6-xylidino s-triazine
2-mercapto 4-phenethylamino 6-chloropropylamino s-triazine Illustrative examples of carboxy-, carboaliphatic- oxy- and carboaromaticoxy-alkyl dihalides that may be used, depending upon the desired end-product, are:

Dichloro carboxy methane
Dibromo carboxy methane
The dichloro carboalkoxy (e. g., carbomethoxy, carboethoxy, carbopropoxy, carbobutoxy, etc.) methanes
The dibromo carboalkoxy methanes
The dichloro carboaroxy (e. g., carbophenoxy, carbonaphthoxy, etc.) methanes
The dibromo carboaroxy methanes
The dichloro carboalkoxy ethanes
The dibromo carboalkoxy ethanes
The diiodo carboalkoxy ethanes
The dichloro carboaroxy ethanes
The dibromo carboaroxy ethanes
The diiodo carboaroxy ethanes
Alpha,beta-dichloro carboethoxy ethane
Alpha,beta-dibromo carboethoxy ethane
Alpha,alpha-dichloro carbobutoxy ethane
Alpha-alpha-dibromo carbobutoxy ethane
Alpha,alpha-dichloro carboethoxy ethane
Alpha,alpha-dibromo carboethoxy ethane
Beta,beta-dichloro carboethoxy ethane
Beta,beta-dibromo carboethoxy ethane
Beta,beta-dichloro carbopropoxy ethane
Beta,beta-dibromo carbopropoxy ethane
Alpha,alpha-dichloro carbopropoxy ethane
Alpha-alpha-dibromo carbopropoxy ethane
Alpha,beta-dichloro carbopropoxy ethane
Alpha,beta-dibromo carbopropoxy ethane
Alpha,alpha-diiodo carboethoxy ethane
Alpha,alpha-diiodo carbophenoxy propane
Alpha-bromo alpha-iodo gamma-phenyl carbonaphthoxy propane
Beta,beta-dichloro carbotoloxy ethane
Beta-isobutyl beta,beta-dibromo carbo-xyloxy ethane
Alpha-chlorophenyl beta-naphthyl beta,beta-diiodo carbobenzoxy ethane
Alpha-cyclopentyl alpha-tolyl beta-chloro beta-iodo carbophenethoxy propane
Alpha-benzyl beta-cyclohexyl alpha,beta-dichloro carbocyclopentoxy pentane
Alpha-xylyl beta,beta-diphenyl alpha,beta-dibromo carbocyclohexoxy ethane
Alpha-bromonaphthyl beta-cresyl beta-tolyl alpha,beta-dichloro carbophenoxy ethane
Beta-phenyl alpha,beta-dichloro carboethoxy propane
Beta-ethyl alpha,beta-dibromo carbophenoxy propane Various hydrohalide acceptors may be employed. We prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the chosen carboxy-, carboaliphaticoxy- or carboaromaticoxy-alkyl dihalide may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. The reaction may be carried out under a variety of temperature and pressure conditions, for instance at normal-subnormal or at elevated temperatures and at atmospheric, sub-atmospheric or super-atmospheric pressures.

The above reaction may be represented by the following general equation:

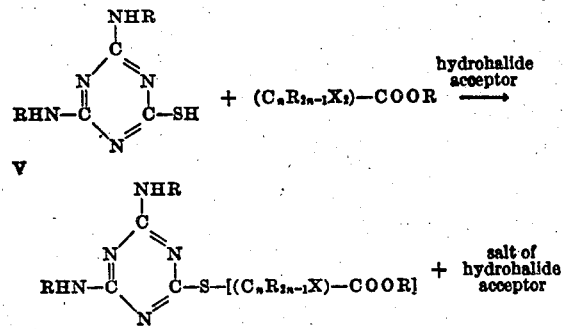

In the above equation $n$, $R$ and $X$ have the same meanings as given above with reference to Formula I.

The new chemical compounds of this invention also may be prepared by a process which comprises effecting reaction between approximately equimolecular proportions of a halogenated diamino s-triazine and a carboxy, carboalophaticoxy or carboaromaticoxy monomercapto monohalide. This reaction preferably is carried out in the presence of an anhydrous solvent. An anhydrous solvent, e. g., alcohol, is desirable because one of the reactants, namely, the halogenated diamino s-triazine, is hydrolyzable. The other conditions for preparing the compounds of the invention may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of diamino s-triazinyl chloro carbomethoxy-ethyl sulfide, the formula for which is

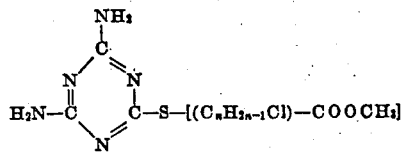

where $n$ has a value of 2.

| | Parts |
|---|---|
| Thioammeline | 28.5 |
| Alpha, beta-dichloro carbomethoxy ethane | 31.4 |
| Sodium hydroxide | 8.7 |
| Water | 350.0 | were stirred rapidly together at room temperature for 17½ hours, yielding a solid precipitate comprising diamino s-triazinyl chloro carbomethoxy-ethyl sulfide. This precipitate was removed by filtration, washed free of soluble salts and dried to obtain the purified product.

*Example 2*

This example illustrates the preparation of diamino s-triazinyl bromo carbomethoxy-ethyl sulfide.

| | Parts |
|---|---|
| Thioammeline | 28.5 |
| Alpha, beta-dibromo carbomethoxy ethane | 49.2 |
| Sodium hydroxide | 8.7 |
| Water | 350.0 | were stirred together rapidly at room temperature for 16½ hours, yielding a solid precipitate comprising diamino s-triazinyl bromo carbomethoxy-ethyl sulfide. This precipitate was filtered off, washed free of soluble salts and dried at room temperature to obtain the purified product.

*Example 3*

4,6-di-(methylamino) s-triazinyl-2 chloro carbomethoxy-ethyl sulfide is produced in essentially the same manner as described under Example 1 with the exception that, instead of thioammeline, an equivalent amount of 2-mercapto 4,6-di-(methylamino) s-triazine is employed.

*Example 4*

Diamino s-triazinyl chloro carboethoxy-ethyl sulfide is prepared in essentially the same manner as described under Example 1 with the exception that, instead of alpha, beta-dichloro carbomethoxy ethane, an equivalent amount of alpha, beta-dichloro carboethoxy ethane is employed.

*Example 5*

Diamino s-triazinyl chloro carbophenoxy-ethyl sulfide is produced in essentially the same manner as described under Example 1 with the exception that, instead of alpha,beta-dichloro carbomethoxy ethane, an equivalent amount of alpha,beta-dichloro carbophenoxy ethane is used.

Other examples of the chemical compounds of this invention are listed below:

The diamino s-triazinyl halogeno carboaliphaticoxy-methyl sulfides, including the diamino s-triazinyl chloro carboaliphaticoxy-methyl sulfides, the diamino s-triazinyl bromo carboaliphaticoxy-methyl sulfides, the diamino s-triazinyl iodo carboaliphaticoxy-methyl sulfides and the diamino s-triazinyl fluoro carboaliphaticoxy-methyl sulfides, more particularly the diamino s-triazinyl halogeno (e. g., chloro, bromo, etc.) alkoxy (e. g., methoxy, ethoxy, propoxy, butoxy, etc.)-methyl sulfides The diamino s-triazinyl halogeno carboaroxy-methyl sulfides, more particularly the diamino s-triazinyl chloro carboaroxy-methyl sulfides, the diamino s-triazinyl bromo carboaroxy-methyl sulfides, the diamino s-triazinyl iodo carboaroxy-methyl sulfides and the diamino s-triazinyl fluoro carboaroxy-methyl sulfides The diamino s-triazinyl halogeno (chloro, bromo, iodo, fluoro) carboxy-methyl sulfides The diamino s-triazinyl halogeno (chloro, bromo, ido, fluoro) carboaliphaticoxy (e. g., carboalkoxy)-ethyl sulfides The diamino s-triazinyl halogeno (chloro, bromo, iodo, fluoro) carboaroxy (e. g., carbophenoxy, carbotoloxy, etc.)-ethyl sulfides The diamino s-triazinyl halogeno (chloro, bromo, iodo, fluoro) carboxy-ethyl sulfides 4-amino 6-methylamino s-triazinyl-2 chloro carboxy-methyl sulfide 4,6-di-(ethylamino) s-triazinyl-2 bromo carboxy-methyl sulfide 4,6-di-(anilino) s-triazinyl-2 chloro carboxy-methyl sulfide 4,6-di-(bromoanilino) s-triazinyl-2 bromo carboxy-methyl sulfide 4,6-di-(cyclohexylamino) s-triazinyl-2 chloro carboxy-methyl sulfide 4,6-diamino s-triazinyl-2 alpha-(alpha-chloro carbomethoxy-ethyl) sulfide 4,6-diamino s-triazinyl-2 beta-(beta-bromo carboethoxy-ethyl) sulfide 4,6-diamino s-triazinyl-2 alpha-(beta-chloro carbopropoxy-ethyl) sulfide 4,6-diamino s-triazinyl-2 beta-(alpha-chloro carboethoxy-ethyl) sulfide 4,6-di-(methylamino) s-triazinyl-2 bromo carbobutoxy-methyl sulfide 4,6-diamino s-triazinyl-2 alpha-(alpha-chloro carbophenoxy-ethyl) sulfide 4,6-diamino s-triazinyl-2 beta-(beta-bromo carbophenoxy-ethyl) sulfide 4,6-diamino s-triazinyl-2 alpha-(beta-chloro carbophenoxy-ethyl) sulfide 4,6-diamino s-triazinyl-2 beta-(alpha-bromo carbophenoxy-ethyl) sulfide 4,6-diamino s-triazinyl-2 alpha-(alpha-chloro carbophenoxy-propyl) sulfide 4,6-di-(anilino) s-triazinyl-2 alpha-(alpha-iodo carbophenoxy-propyl) sulfide 4,6-di-(cyclopentylamino) s-triazinyl-2 alpha-(gamma-phenyl alpha-chloro carbonaphthoxy-propyl) sulfide 4-ethylamino 6-amino s-triazinyl-2 beta-(beta-chloro carbotoloxy-ethyl) sulfide 4-isobutylamino 6-neopentylamino s-triazinyl-2 beta-(alpha-phenyl beta-naphthyl beta-iodo carbobenzoxy-ethyl) sulfide 4-naphthylamino 6-amino s-triazinyl-2 beta-(beta-isobutyl beta-bromo carbo-xyloxy-ethyl) sulfide 4-benzylamino 6-toluido s-triazinyl-2 beta-(alpha-tolyl alpha-cyclopentyl beta-chloro carbophenethoxy-propyl) sulfide 4-phenethylamino 6-xylidino s-triazinyl-2 alpha-(alpha-phenethyl beta-phenyl beta-bromo carbocyclopentoxy-ethyl) sulfide 4,6-diamino s-triazinyl-2 alpha-(alpha-chloro carboxy-ethyl) sulfide 4,6-diamino s-triazinyl-2 beta-(beta-bromo carboxy-ethyl) sulfide 4,6-diamino s-triazinyl-2 alpha-(beta-chloro carboxy-ethyl) sulfide 4,6-diamino s-triazinyl-2 beta-(alpha-bromo carboxyl-ethyl) sulfide 4-cyclopentenylamino 6-xylidino s-triazinyl-2 beta-(alpha-chloro beta-benzyl carboethoxy-propyl) sulfide 4-amino 6-methylamino s-triazinyl-2 alpha-(beta-chlorophenyl beta-chloro carboethoxy-ethyl) sulfide In a manner similar to that described above with particular reference to the diamino [(—NHR)₂] s-triazinyl halogeno carboxy-, carboaliphaticoxy- and carboaromatic-oxy-methyl and -ethyl sulfides, corresponding derivatives of the asymmetrical and vicinal triazines may be prepared. It also will be understood by those skilled in the art from the foregoing description of the preparation of a triazine monosulfide that similar compounds may be prepared in which two or three sulfur atoms are attached directly to a carbon atom of the triazine nucleus and which have attached to each sulfur atom a

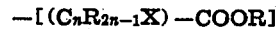

grouping, wherein $n$, $X$ and $R$ have the same meanings as given above with reference to Formula I.

What we claim as new and desire to secure by Letters Patent of the United States is:

1. Chemical compounds corresponding to the general formula

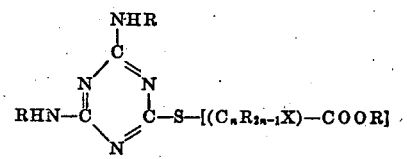

where $n$ represents an integer and is at least 1 and not more than 2, $X$ represents a halogen atom, and $R$ represents a member of the class consisting of hydrogen and monovalent hydrocarbon and halo-hydrocarbon radicals.

2. Chemical compounds as in claim 1 wherein $R$ represents a hydrogen atom.

3. Chemical compounds as in claim 1 wherein $X$ represents a chlorine atom.

4. Chemical compounds as in claim 1 wherein $X$ represents a bromine atom.

5. Chemical compounds corresponding to the general formula

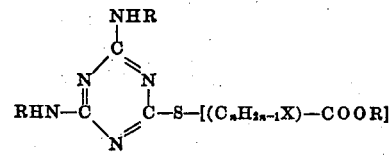

where $n$ represents an integer and is at least 1 and not more than 2, $X$ represents a halogen atom, and $R$ represents a member of the class consisting of hydrogen and monovalent hydrocarbon and halo-hydrocarbon radicals.

6. Chemical compounds corresponding to the general formula

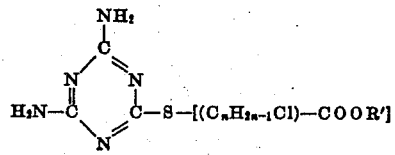

where $n$ represents an integer and is at least 1 and not more than 2, and $R'$ represents a member of the class consisting of hydrogen and unsubstituted monovalent hydrocarbon radicals.

7. Chemical compounds corresponding to the general formula

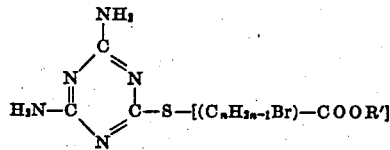

where $n$ represents an integer and is at least 1 and not more than 2, and R' represents a member of the class consisting of hydrogen and unsubstituted monovalent hydrocarbon radicals.

8. A diamino s-triazinyl halogeno carboaliphaticoxy-ethyl sulfide.

9. A diamino s-triazinyl chloro carboalkoxy-ethyl sulfide.

10. A diamino s-triazinyl chloro carbomethoxy-ethyl sulfide.

11. A diamino s-triazinyl bromo carboalkoxy-ethyl sulfide.

12. A diamino s-triazinyl bromo carbomethoxy-ethyl sulfide.

13. A diamino s-triazinyl halogeno carboaromaticoxy-ethyl sulfide.

14. A diamino s-triazinyl chloro carboaromaticoxy-ethyl sulfide.

15. A diamino s-triazinyl chloro carbophenoxy-ethyl sulfide.

16. The method of preparing chemical compounds corresponding to the general formula

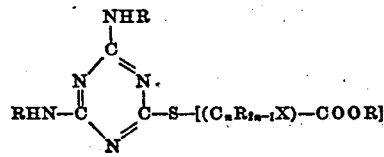

where $n$ represents an integer and is at least 1 and not more than 2, X represents a halogen atom, and R represents a member of the class consisting of hydrogen and monovalent hydrocarbon and halo-hydrocarbon radicals, said method comprising effecting reaction, in the presence of a hydrohalide acceptor, between approximately equimolecular proportions of (1) a mercapto triazine corresponding to the general formula

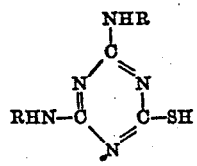

where R has the meaning above given, and (2) a compound corresponding to the general formula

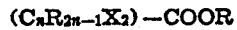

$$(C_nR_{2n-1}X_2)-COOR$$

where $n$, X and R have the meanings above given.

17. A method as in claim 16 wherein X represents a chlorine atom and the hydrohalide acceptor is an alkali-metal hydroxide.

18. A method as in claim 16 wherein X represents a bromine atom and the hydrohalide acceptor is an alkali-metal hydroxide.

19. The method of preparing diamino s-triazinyl chloro carbomethoxy-ethyl sulfide which comprises effecting reaction, in the presence of a hydrohalide acceptor, between approximately equimolecular proportions of thioammeline and alpha,beta-dichloro carbomethoxy ethane.

20. The method of preparing diamino s-triazinyl bromo carbomethoxy-ethyl sulfide which comprises effecting reaction, in the presence of a hydrohalide acceptor, between approximately equimolecular proportions of thioammeline and alpha,beta-dibromo carbomethoxy ethane.

GAETANO F. D'ALELIO.
JAMES W. UNDERWOOD.

CERTIFICATE OF CORRECTION.

Patent No. 2,335,045. November 23, 1943.

GAETANO F. D'ALELIO, ET AL.

It is hereby certified that error appears in the printed specification of the above numbered patent requiring correction as follows: Page 1, first column, line 15, before the formula insert the Roman numeral --I--; page 2, first column, line 20, for "corboxy-" read -- carboxy- --; line 37, after "6-mercapto" strike out the comma; and second column, line 14-15, for "carboaliphatic- oxy-" read -- carboaliphaticoxy- --; lines 37 and 45, for "Alpha-alpha-" read -- Alpha,alpha- --; page 3, first column, line 6, for "tributbyl" read --tributyl--; line 21, for "normal-sub-" read -- normal, sub- --; line 49-50, for "carboalophatioxy" read --carboaliphaticoxy--; line 72, before the formula insert the Roman numeral --VI--; page 4, first column, line 4, for "ido" read --iodo--; line 67, for "carboxyl" read --carboxy--; and second column, line 3, for "carboaromatic-oxy-methyl" read --carboaromaticoxy-methyl--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.